United States Patent [19]

Kato

[11] Patent Number: 5,211,528
[45] Date of Patent: May 18, 1993

[54] INDUSTRIAL ROBOT APPARATUS
[75] Inventor: Hisao Kato, Aichi, Japan
[73] Assignee: Mitsubishi Denki Kabushiki Kaisha, Tokyo, Japan
[21] Appl. No.: 821,133
[22] Filed: Jan. 15, 1992

Related U.S. Application Data

[63] Continuation of Ser. No. 570,810, Aug. 22, 1990, abandoned.

[30] Foreign Application Priority Data

Aug. 31, 1989 [JP] Japan ................................ 1-225823
Jan. 10, 1990 [JP] Japan .................................... 2-2864

[51] Int. Cl.⁵ .............................................. B65G 1/18
[52] U.S. Cl. ................... 414/789.6; 414/790.9; 414/729.9; 414/799; 414/902
[58] Field of Search ................ 414/789.6, 790.9, 799, 414/792.9, 901, 902, 222, 228, 744.8, 225, 793.8; 901/30, 7; 29/568; 198/444, 448, 451, 958, 362, 366, 357, 358

[56] References Cited

U.S. PATENT DOCUMENTS

| | | | |
|---|---|---|---|
| 3,371,767 | 3/1968 | Rehr et al. | 198/448 X |
| 3,506,110 | 4/1970 | Paul et al. | 198/451 |
| 4,117,943 | 10/1978 | Holland et al. | 414/789.6 X |
| 4,274,779 | 6/1981 | Longinotti | 414/225 X |
| 4,526,266 | 7/1985 | Dietz | 198/444 X |
| 4,527,936 | 7/1985 | Hartlieb | 414/790.9 X |
| 4,685,850 | 8/1987 | Ohta et al. | 414/222 X |
| 4,692,876 | 9/1987 | Tenma et al. | 414/799 X |
| 4,746,255 | 5/1988 | Roccabianca et al. | 414/902 X |
| 4,754,866 | 7/1988 | Billington et al. | 198/451 |
| 4,781,512 | 11/1988 | Ohta et al. | 414/222 |
| 4,786,229 | 11/1988 | Henderson | 414/799 X |
| 4,817,017 | 3/1989 | Kato | 364/513 |
| 4,850,783 | 7/1989 | Maekawa | 186/55 X |
| 4,947,702 | 8/1990 | Kato | 74/479 |
| 4,947,770 | 8/1990 | Kato | 74/479 |
| 4,969,109 | 11/1990 | Mizuno et al. | 414/788 X |
| 4,976,584 | 12/1990 | Focke | 414/789.6 |

FOREIGN PATENT DOCUMENTS

| | | | |
|---|---|---|---|
| 248782 | 8/1987 | Fed. Rep. of Germany | 414/789.6 |
| 3814101 | 11/1988 | Fed. Rep. of Germany | 414/902 |
| 92967 | 11/1983 | Japan | 414/902 |
| 21630 | 1/1987 | Japan | 414/792.9 |
| 36225 | 2/1987 | Japan | 414/902 |
| 161629 | 7/1987 | Japan | 414/902 |
| 71028 | 3/1988 | Japan | 414/902 |
| 1275309 | 11/1989 | Japan . | |
| 1275309 | 11/1989 | Japan . | |
| 1275310 | 11/1989 | Japan . | |
| 1276310 | 11/1989 | Japan . | |
| 2155212 | 2/1985 | United Kingdom . | |
| 2183820 | 11/1985 | United Kingdom . | |

OTHER PUBLICATIONS

FMC Model 250 Bulletin Robot Case Palletizer pp. 1-4 dated 1984.

Primary Examiner—David H. Bollinger
Attorney, Agent, or Firm—Leydig, Voit & Mayer

[57] ABSTRACT

An industrial robot apparatus comprises a plurality of storage devices for accommodating workpieces of specified kinds, respectively; a supply device for supplying workpieces from at least two of the storage devices; a supply command device for giving the supply device an instruction directing the kinds of workpieces and the number of workpieces by kind supplied from the storage devices, for issuing a conveyance command in time to convey the workpieces by kind; a plurality of pallets; an industrial robot for stowing supplied workpieces onto the pallets; and a stowage command device for giving the industrial robot an instruction directing the kinds of workpieces and the number of workpieces by kind to be stowed onto the pallets.

7 Claims, 7 Drawing Sheets

INDUSTRIAL ROBOT APPARATUS

This application is a continuation of application Ser. No. 07/570,810, filed Aug. 22, 1990, now abandoned.

BACKGROUND OF THE INVENTION

1. Field of the Invention

The present invention relates to an industrial robot apparatus for stowing various kinds of workpieces, in directed number each kind, in mixture, onto a plurality of pallets.

2. Prior Art

For example, Japanese Patent Unexamined Publication No. 61-33426, disclosure a system in which, when sizes of some packages are directed, a stowage pattern is formed and the packages are received in a desired order in accordance with the stowage plan so that the received packages are stowed onto pallets.

The conventional industrial robot apparatus of the kind as described above has problems in that the apparatus becomes complicated and expensive to carry out an operation for stowing a plurality of kinds of workpieces, the number of which is directed by kind, onto each pallet. It is difficult to make the package handling speed high, and a wide space is required for handling a large number of workpieces.

SUMMARY OF THE INVENTION

It is therefore an object of the present invention to solve the above problems in the prior art.

It is another object of the present invention to provide an industrial robot apparatus which can be inexpensively manufactured and which can easily process a number of workpieces in accordance with directed stowage information.

In order to attain the above objects, according to the present invention, the industrial robot apparatus comprises: a plurality of storage devices for accommodating workpieces of specified kinds, respectively; a supply device for supplying workpieces stored in the storage devices from at least two of the plurality of storage devices; a supply command device for giving the supply devices instructions to direct the kinds of workpieces and the number of workpieces by kind to be supplied from the storage devices and for issuing a conveyance command in time to convey the workpieces by kind to be supplied; an industrial robot for stowing supplied workpieces onto a plurality of pallets; and a stowage command device for giving the industrial robot instructions to direct the kinds of workpieces and the number of workpieces by kind to be stowed onto the plurality of pallets.

In the thus configured industrial robot apparatus, for a series of stowing operations, required workpieces are supplied by kind in time, and the supplied workpieces are directed to be held by kind by the industrial robot so that the workpieces of required kinds, in required number every kind, are stowed onto every pallet.

DETAILED DESCRIPTION OF PREFERRED EMBODIMENTS

Figure 1:
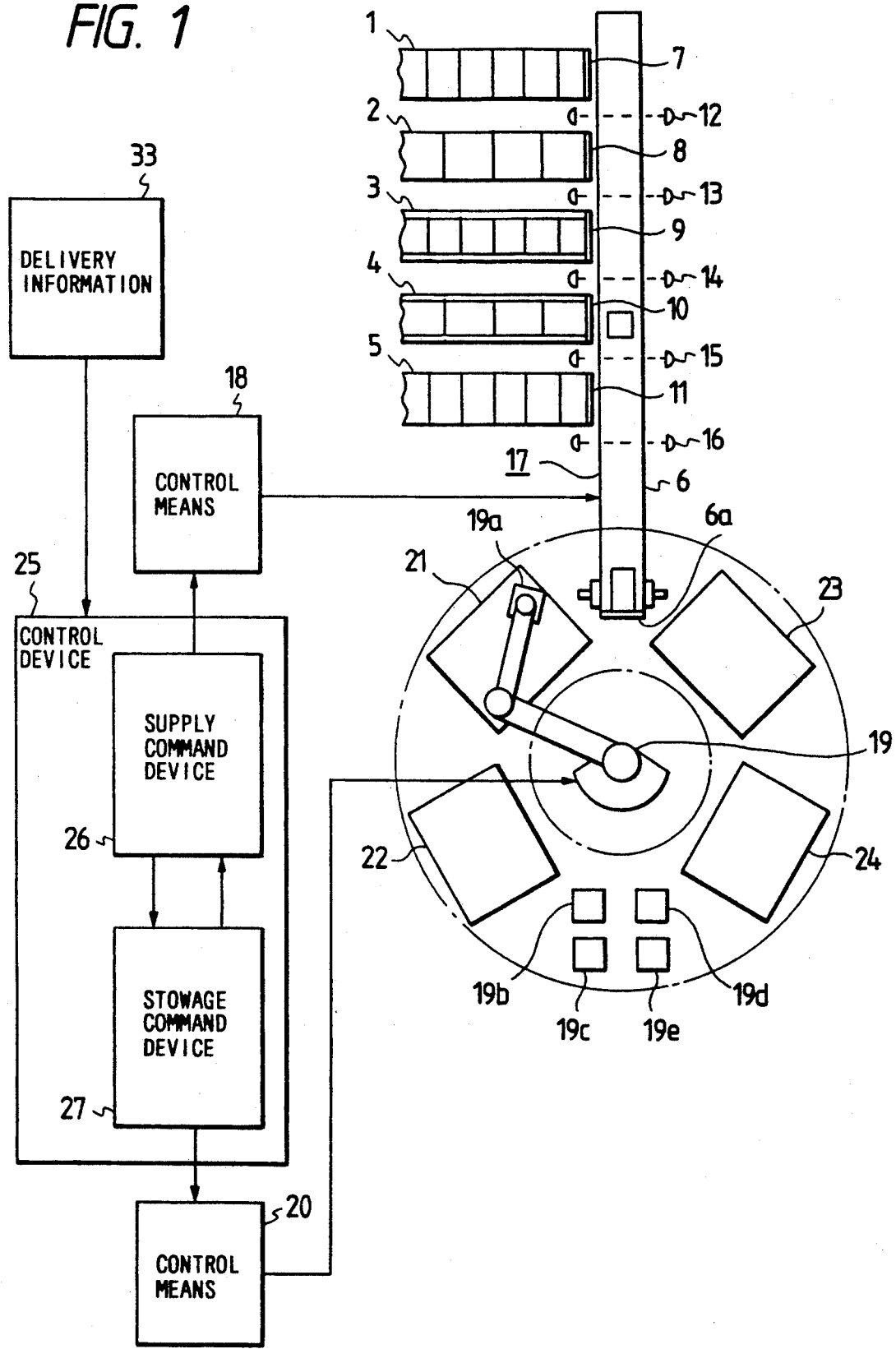
FIG. 1 is a schematic view showing the whole configuration of an embodiment of the industrial robot apparatus according to the present invention.
Figure 2:
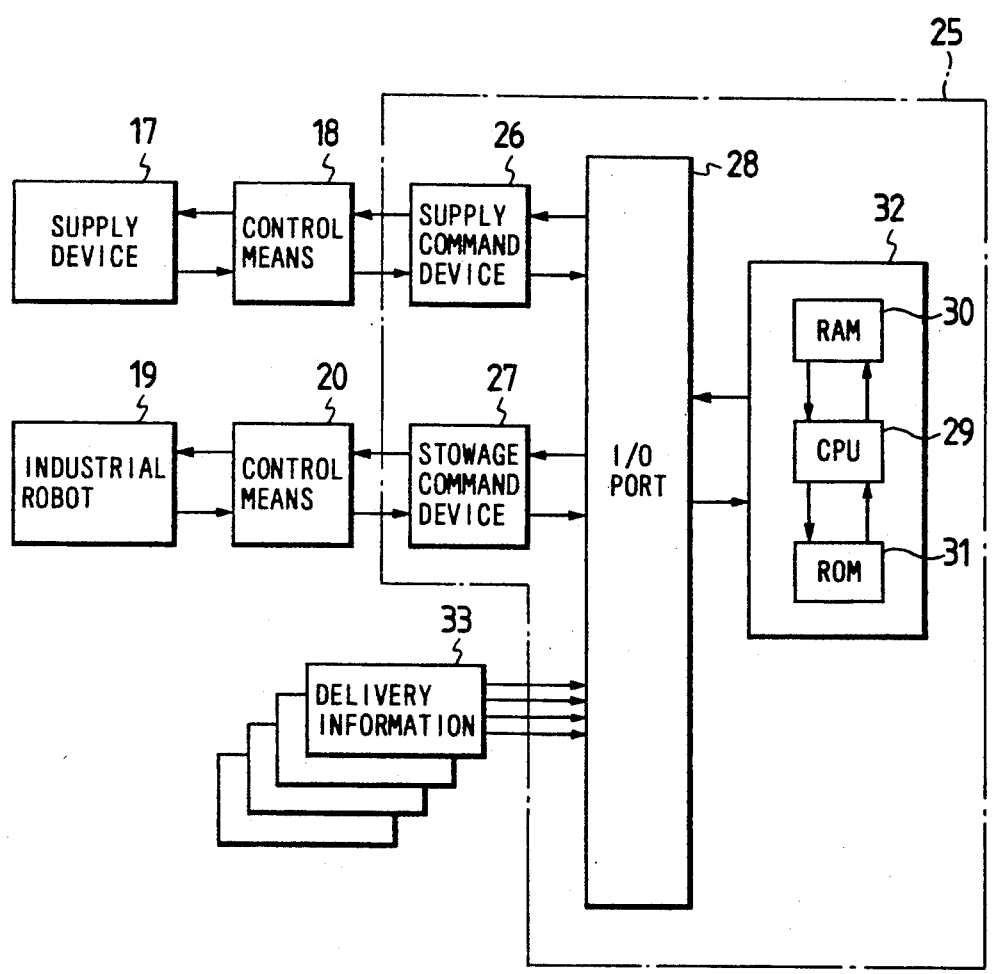
FIG. 2 is a schematic block diagram showing electrical connection among blocks in the embodiment of FIG. 1.
Figure 3:
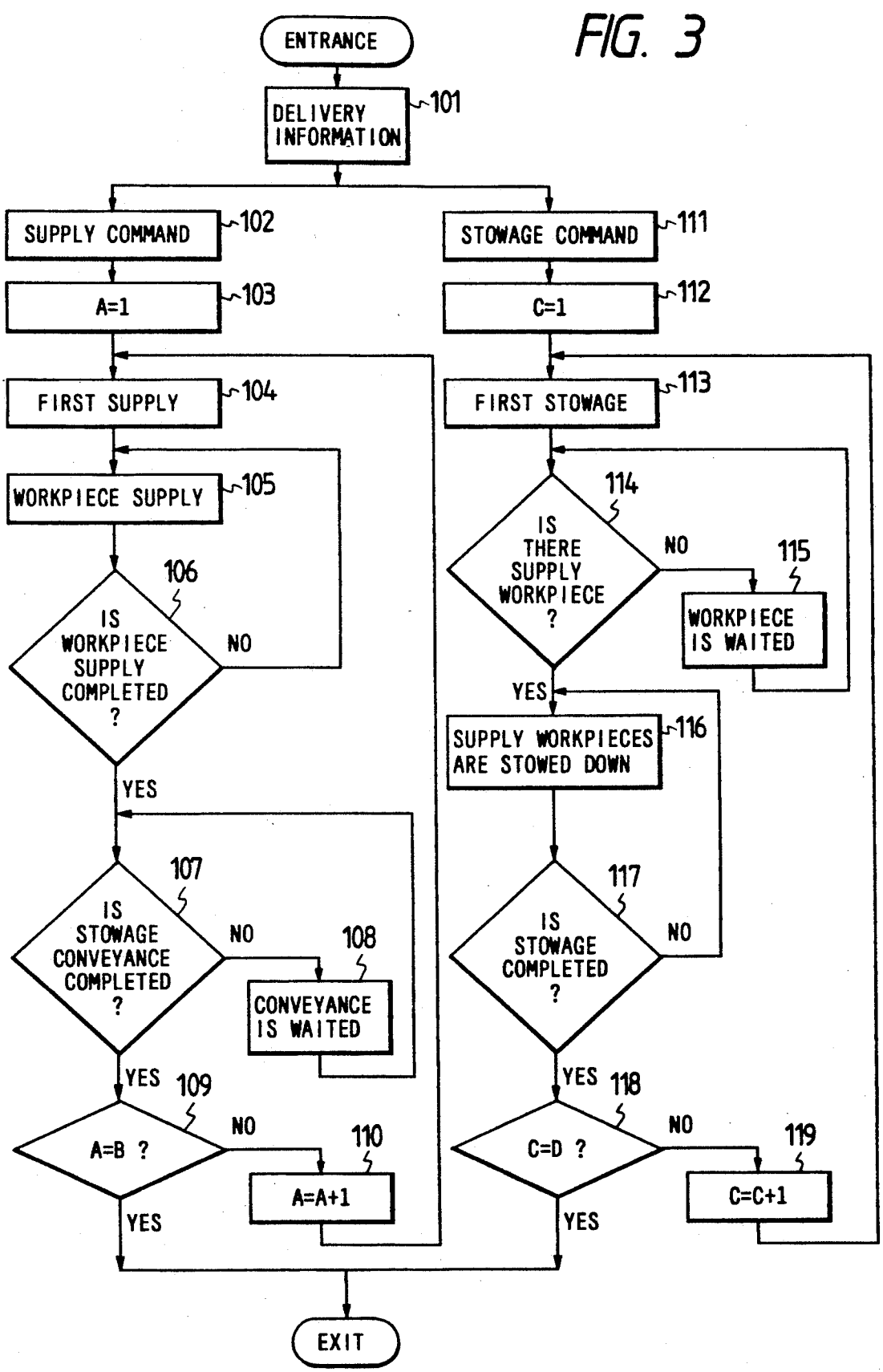
FIG. 3 is a flowchart for explaining the operation of main part of the embodiment of FIG. 1.

Referring to FIGS. 1 through 3, an embodiment of the industrial robot apparatus according to the present invention will be described hereunder. In the drawings, the industrial robot apparatus includes. The following stored devices 1 through 5 comprise respective conveyers for accommodating specified workpieces different from each other, that is, a first storage device 1, a second storage device 2, a third storage device 3, a fourth storage device 4, and a fifth storage device 5. A feeding conveyer 6 is provided at respective end portions of the first through fifth storage devices 1 through 5 so as to be perpendicular thereto, the feeding conveyer 6 being provided with a stopper 6a at an end thereof. Stopping mechanisms 7 through 11, respectively, are provided at the respective ends of the first through fifth storage devices 1 through 5. Counters 12 through 16 are provided corresponding to the respective first through fifth storage devices 1 through 5 such that respective optical axes of the counters 12 through 16 cross the feeding conveyer 6. A supply device 17 comprise the feeding conveyer 6, the stopping mechanisms 7 through 11, and the counters 12 through 16, the supply device 17 being provided with control means 18. An industrial robot 19 is provided at the end portion of the feeding conveyer 6, the industrial robot being provided with a removable hand 19a. Interchangeable hands 19b through 19e for the industrial robot 19 are prepared in the vicinity of the industrial robot 19. Control means 20 are provided for the industrial robot 19. Pallets 21 through 24, respectively, are provided in predetermined positions in the vicinity of the industrial robot 19. Control means 25 comprises a supply command device 26 including a program for supplying workpieces, a stowage command device 27 including a program for stowing workpieces, an I/O port 28, a computer 32 having a CPU 29, a RAM 30 and a ROM 31, etc. The reference numeral 33 designates stowage directions, that is, a series of delivery information.

Referring to FIG. 3 showing the flowchart, the operation of the industrial robot apparatus having such a configuration as described above will be described hereunder. Empty pallets 21 through 24 are prepared. Upon issuance of a series of delivery information in a step 101, the supply command device 26 is actuated to issue a supply command in a step 102. A first supply in a step 104 is performed by the operation of the supply device 17 through a step 103. That is, one of the respective stopping mechanisms 7 through 11 of the first through fifth storage devices 1 through 5 is released corresponding to the first supply so that workpieces are discharged from the corresponding storage device onto the conveyer 6 to thereby perform the workpiece supply in a step 105. The number of the discharged workpieces is counted by the corresponding counter, and the supply is continued until the counted number reaches the directed value in a step 106. When the counted number reaches the directed value, the supply is stopped. Subsequently, unless stowage conveyance of the supplied workpieces described later is completed in a step 107, the workpiece supply is interrupted to wait for the conveyance in a step 108. When the stowage conveyance has been completed, the operation is shifted to a step 109 in which if the number of times of supply is not the directed value, the second supply is performed for workpieces received in another storage device in the step 104 through a step 110 similarly to the first supply. When the number of times of supply reaches the directed value so that workpieces in required kinds and in the required number for every kind have been supplied, the workpiece supply in accordance with the series of delivery information is completed. On the other hand, the stowage command device 27 is actuated in accordance with the delivery information in the step 101 to issue a stowage command in a step 111. The first stowage is performed by the industrial robot 19 in a step 113 through a step 112. When no supply workpiece is on the supply conveyer 6 in a step 114, workpieces are waited for in a step 115. On the other hand, if there exist supply workpieces on the supply conveyer 6, one of the hands 19a through 19e is designated to be automatically mounted on the industrial robot 19, and workpieces are conveyed so that the supply workpieces in the directed number are stowed down on designated pallets in a step 116. When the stowage is not completed in a step 117, the stowage is continued. When the stowage has been completed, the operation is shifted to a step 118. When the number of times of stowage has not reached the directed value, the second stowage is performed through a step 119 similarly to the first stowage. When the number of times of stowage has reached the directed value so that workpieces in the required kinds and in the required number for every kind have been stowed on the pallets 21 through 24, the stowage in accordance with the series of delivery information is completed. Thus, a large number of workpieces can be easily stowed in accordance with the directed delivery information 33 inexpensively and by means of a simple apparatus configuration which can be provided in a narrow space.

Examples of the supply command, states of pallets, and stowage command will be described in the following Table.

In the Table, the characters A, B, C, D, and E represent kinds of workpieces, and the numbers added to those characters represent the number of workpieces. In some cases, a program is made such that the workpieces of the same kind E are divisionally supplied and stowed at first and fourth times taking the order of stowage into consideration.

TABLE

| Supply/stowage order | 1 | 2 | 3 | 4 | 5 | 6 | 7 |
|---|---|---|---|---|---|---|---|
| Supply command | E11 | D7 | C5 | E4 | C7 | A5 | B5 |
| Stowage command pallet 21 | E2 | D2 | | E2 | C5 | A3 | |
| Stowage command pallet 22 | E3 | | C2 | | | A2 | |
| Stowage command pallet 23 | E1 | D5 | | E2 | C2 | | |
| Stowage command | E5 | | C3 | | | | B5 |

TABLE -continued

| Supply/stowage order | 1 | 2 | 3 | 4 | 5 | 6 | 7 |
|---|---|---|---|---|---|---|---|
| pallet 24 | | | | | | | |

Figure 4:
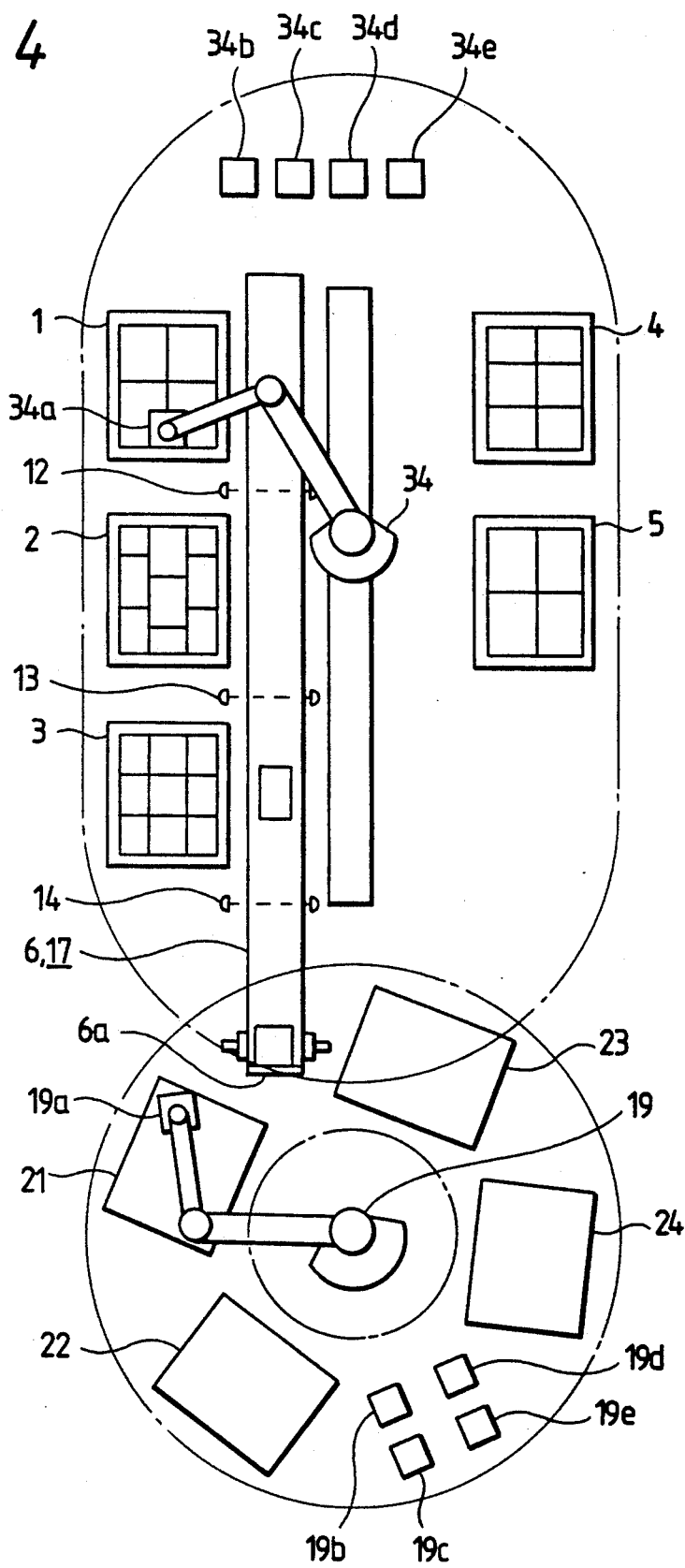
FIG. 4 is a schematic view corresponding to FIG. 1 and showing another embodiment of the industrial robot apparatus according to the present invention.

FIG. 4 is a view showing another embodiment of the industrial robot apparatus according to the present invention. In the drawing, items the same as those in FIGS. 1 through 3 are correspondingly referenced. The industrial robot apparatus includes the following components. First through fifth storage devices 1 through 5 each comprise a stand. A counter 12 is provided corresponding to the first and fourth storage devices 1 and 4. Another counter 13 is provided corresponding to the second and fifth storage devices 2 and 5. A further counter 14 is provided corresponding to the third storage device. A running robot 34 is arranged to run along a supply conveyer 6 and is provided with a movable hand 34a. The reference numerals 34b through 34e represent interchangeable hands 34b through 34e which are prepared for the running robot 34 so that they can be automatically selectively mounted on the running robot 34 in accordance with a supply command. The reference numeral 17 represents a supply device constituted by the supply conveyer 6, the counters 12 through 14, and the running robot 34.

That is, the embodiment shown in FIG. 4 is also provided with the supply device 17, an industrial robot 19, a control device 25, etc. so as to perform operation similar to that shown in the flowchart in FIG. 3 similarly to the embodiment shown in FIGS. 1 through 3. Accordingly, although the detailed description as to the operation will be omitted, it is apparent that operation similar to that of the embodiment in FIGS. 1 through 3 is obtained in the embodiment in FIG. 4.

Figure 5:
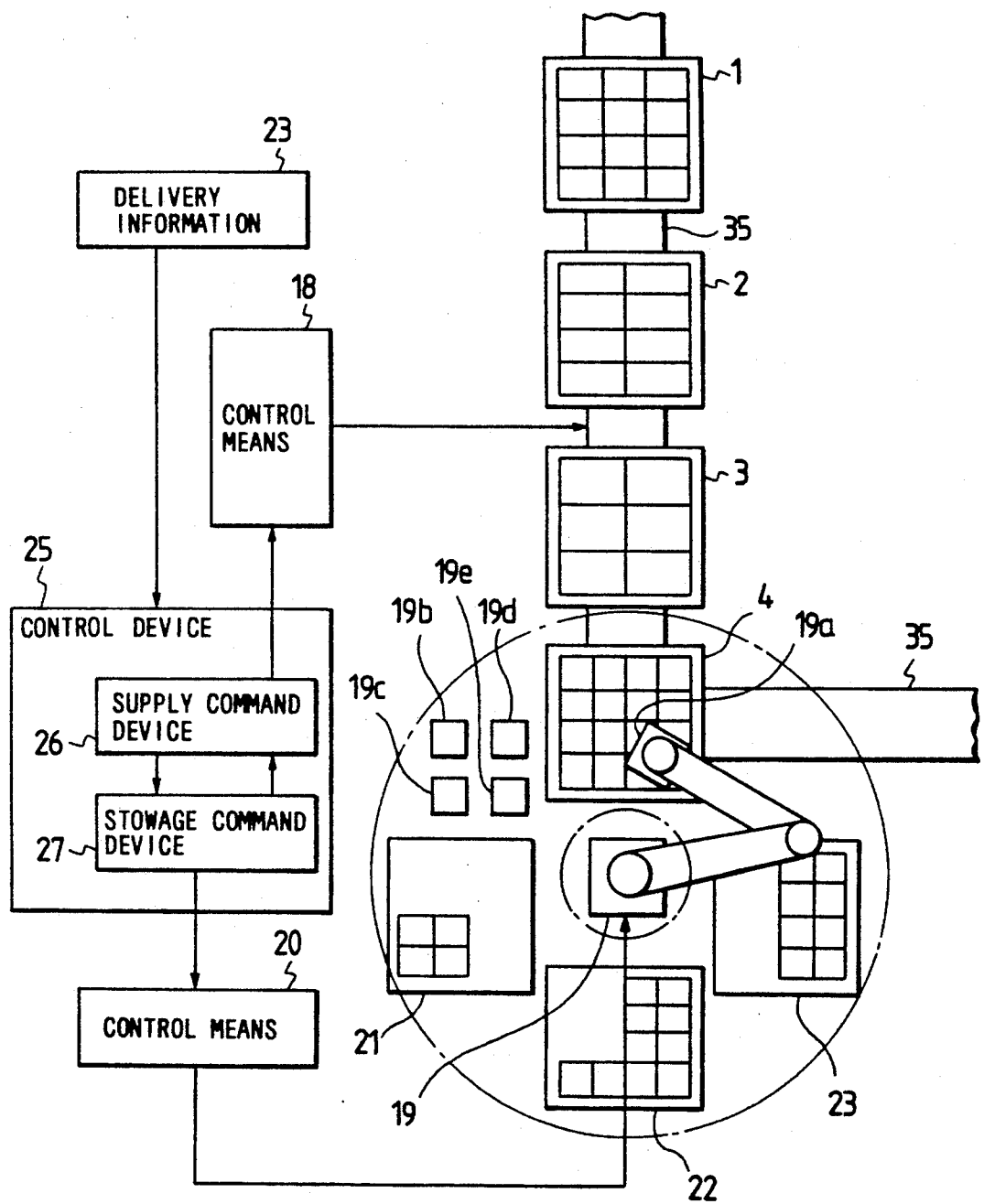
FIG. 5 is a schematic view corresponding to FIG. 1 and showing a further embodiment of the industrial robot apparatus according to the present invention.
Figure 6:
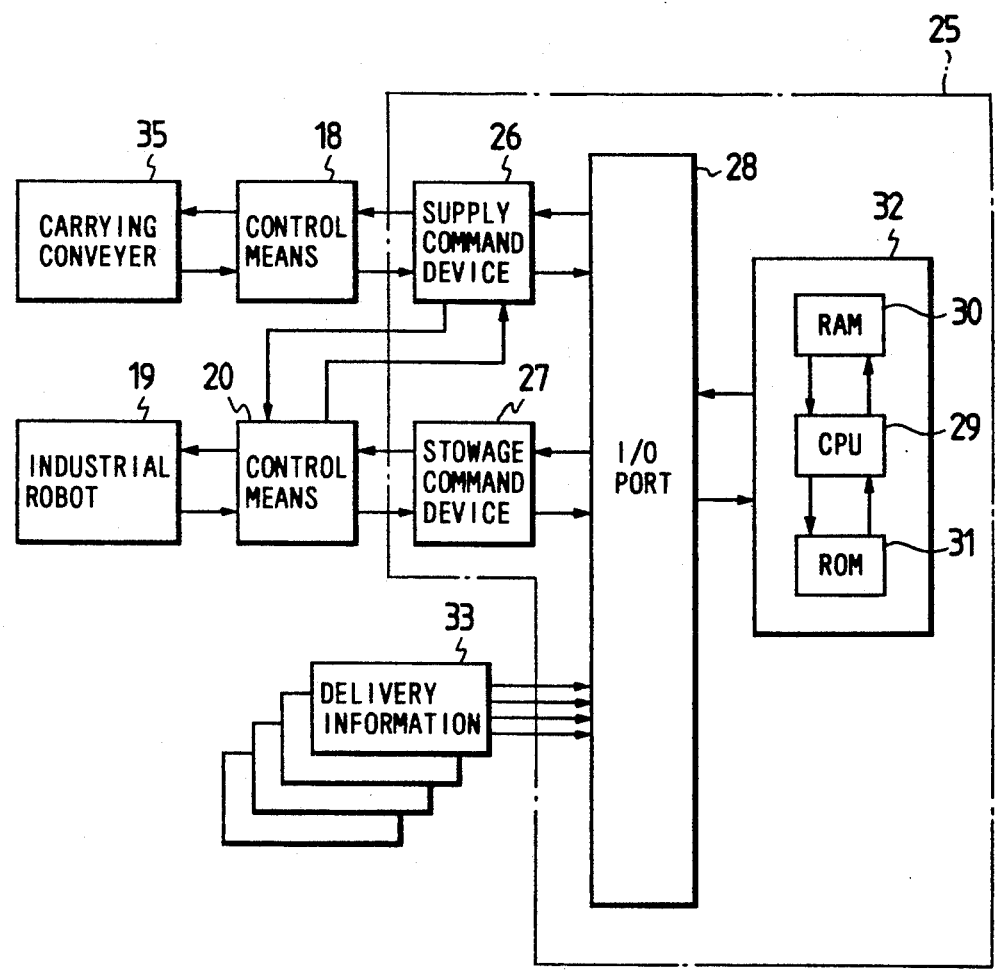
FIG. 6 is a schematic block diagram corresponding to FIG. 2 and showing electric connection among blocks in the embodiment of FIG. 5.
Figure 7:
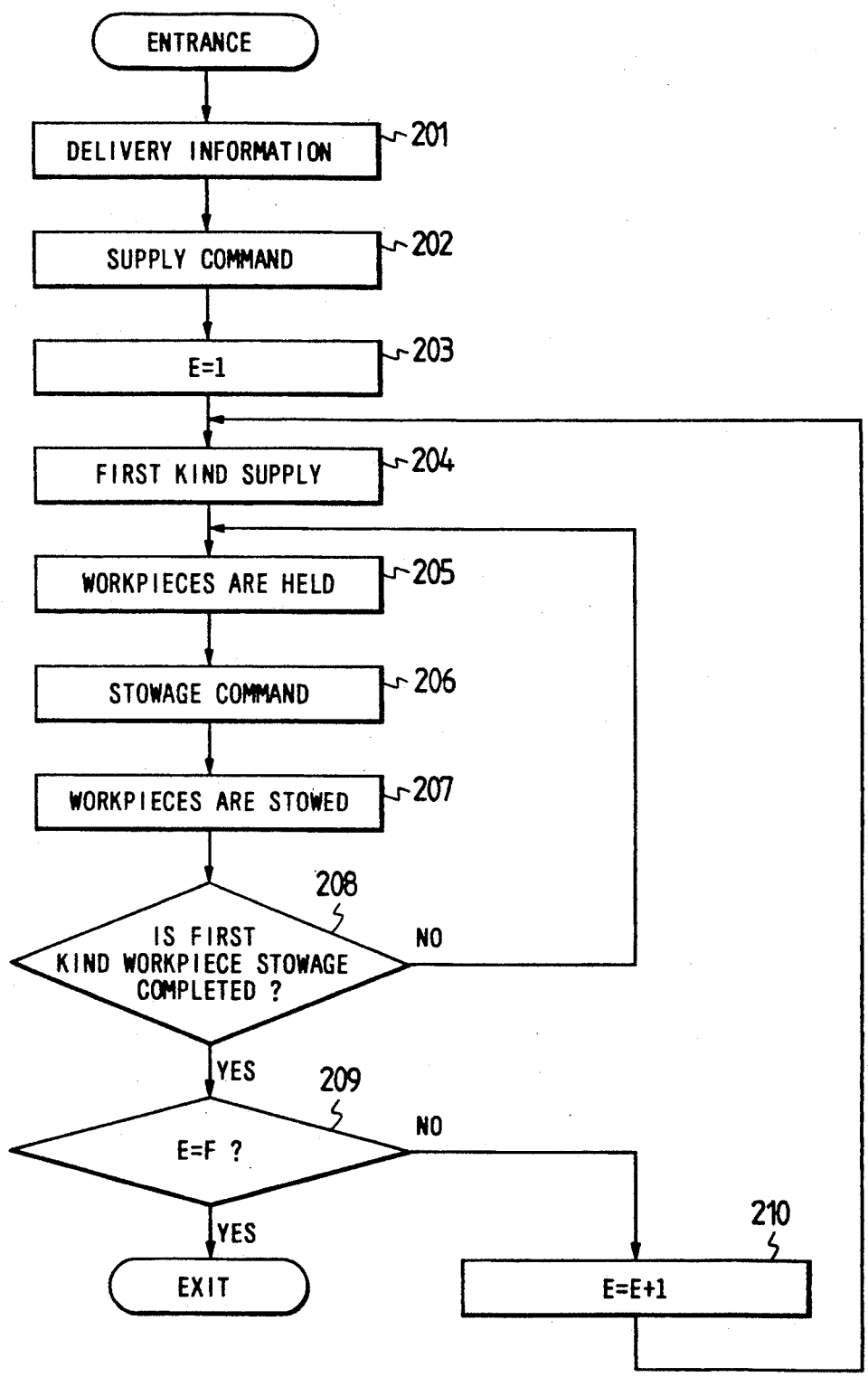
FIG. 7 is a flowchart corresponding to FIG. 3 and for explaining the operation of main part of the embodiment of FIG. 5.

FIGS. 5 through 7 are views showing a further embodiment of the industrial robot apparatus according to the present invention. In the drawings, items the same as those in FIGS. 1 through 3 are correspondingly referenced. The industrial robot apparatus includes the following components. Each one of first through fourth storage devices 1 through 4 comprises plate 35 mounted on a carrying conveyer 35. A control means 18 controls the carrying conveyer 35. Pallets 21 through 23 are provided at predetermined positions in the vicinity of an industrial robot 19.

Referring to FIG. 7 showing a flowchart, the operation of the industrial robot apparatus having such a configuration as described above will be described. The empty pallets 21 through 23 are prepared. When a series of delivery information is issued in a step 201, a supply command device 26 is actuated to thereby issue a supply command to the industrial robot 19 and the carrying conveyer 35 in a step 202. A first kind supply is performed in a step 204 through a step 203. That is, in the first kind supply, workpieces in the first storage device 1 are made to be a subject, the first storage device 1 is made to face the industrial robot 19 by the action of the carrying conveyer 35, and the workpieces are held by the industrial robot 19 in a step 205. Subsequently, the held workpieces are stowed on a designated one of the pallets 21 through 23 by the action of the stowage command device 27 in accordance with a stowage command in a step 206, so that the workpieces are stowed in a step 207. If the first kind workpiece stowage has not been completed in a step 208, the operation from the step 205, in which the workpieces are held, to the step 207 is repeated. When the fist kind workpiece stowage has been completed in the step 208, the operation is shifted to a step 209. If the value E is not equal to the value F of the directed kind in the step 209, the operation is returned to the step 204 through a step 210 so as to perform a second kind supply. That is, in the second kind supply, the second storage device 2 is made to face the industrial robot 19, and the operation similar to that in the first kind supply is performed for workpieces in the second storage device 2. When the value E becomes equal to the value F of the directed kind in the step 9, the supply of the workpieces and the stowage operation in accordance with the delivery information is completed.

That is, also in the embodiment shown in FIGS. 5 and 6, there is provided the control device 25 for issuing a supply command and a stowage command to the industrial robot 19 so as to perform the operation shown in the flowchart in FIG. 7. Accordingly, although the detailed description of the operation is omitted, it is apparent that the operation similar to that of the embodiment of FIGS. 1 through 3 is obtained in this embodiment of FIGS. 5 through 7.

As described above, according to the present invention, the industrial robot apparatus includes: a supply device and a supply command device for supplying necessary workpieces from a plurality of storage devices each of which has workpieces of a specified kind, or a supply command device for causing an industrial robot to hold required workpieces; and the industrial robot and a stowage command device for stowing the required workpieces onto a plurality of the pallets; whereby necessary workpieces are supplied by kind in time in accordance with a series of delivery information or directed to be held so that the workpieces of required kinds and of the required number for every kind are stowed on the pallets respectively. Accordingly, with an industrial robot apparatus according to the invention, a large number of workpieces can be easily stowed in accordance with directed delivery information with a simple structure.

What is claimed is:

1. An industrial robot apparatus comprising:
 a plurality of storage means for storing different kinds of workpieces, each of the storage means storing one of the different kinds of workpieces;
 a plurality of pallets on which workpieces are to be stowed;
 conveying means for conveying the workpieces of at least two of the storage means;
 supply command means operated responsive to an information program that instructs a predetermined number of each kind of workpiece be supplied from each of the storage means, the predetermined number of each kind of workpiece being supplied together during a specified period of the program;
 robot means for stowing workpieces on the pallets and having a movable hand, a plurality of separate interchangeable hand attachments disposed in the vicinity of the robot means, each hand attachment corresponding to one of the different kinds of workpieces so that the robot means has the capability of holding each of the different kinds of workpieces when the corresponding hand attachment is mounted on the robot means, transferring the workpieces by the movable hand, and stowing them on any one of the pallets; and
 stowage command means operated responsive to the information program that directs the robot means during a specified period of the program to mount a selected one of the hand attachments corresponding to the kind of workpiece being supplied during the specified period, to transfer the predetermined number of workpieces supplied together during that period using the selected hand attachment from the conveying means, and to divide them among the plurality of pallets,
 whereby each pallet is stowed with a mix of different kinds of workpieces, all the workpieces of each kind being supplied together to the robot means and divided among the pallets as directed by the information program.

2. An apparatus as claimed in claim 1, further comprising counter means provided corresponding to said storage means for counting the number of the workpieces being supplied.

3. An industrial robot apparatus according to claim 1 wherein the conveying means includes a conveyor, the plurality of storage means are arranged adjacent the conveyor, and workpieces are supplied to the conveyor from the plurality of storage means and carried thereby to the robot means.

4. An industrial robot apparatus according to claim 3 including means for counting the workpieces supplied to the conveyor from each of the storage means.

5. An industrial robot apparatus according to claim 1 wherein a second robot means is provided for supplying workpieces from the plurality of storage means to the conveyor means to be carried thereby to the first mentioned robot means.

6. An industrial robot apparatus according to claim 5 including means for counting workpieces supplied from each of the storage means.

7. An industrial robot apparatus according to claim 1 wherein the conveying means includes a conveyor and the plurality of storage means are carried by the conveyor to the robot means.

* * * * *